United States Patent [19]
Flockhart et al.

[11] Patent Number: 5,754,639
[45] Date of Patent: *May 19, 1998

[54] METHOD AND APPARATUS FOR QUEUING A CALL TO THE BEST SPLIT

[75] Inventors: Andrew Derek Flockhart, Thornton, Colo.; Eugene Paul Mathews, Barrington, Ill.

[73] Assignee: Lucent Technologies, Murray Hill, N.J.

[*] Notice: The term of this patent shall not extend beyond the expiration date of Pat. No. 5,740,238.

[21] Appl. No.: 552,642

[22] Filed: Nov. 3, 1995

[51] Int. Cl.⁶ .................... H04M 7/00; H04Q 3/64
[52] U.S. Cl. .................... 379/221; 379/113; 379/265; 379/266; 379/309
[58] Field of Search .................... 379/265, 266, 379/309, 211, 212, 112, 219, 220, 221, 113; 370/412, 413, 415, 417

[56] References Cited

U.S. PATENT DOCUMENTS

| | | | |
|---|---|---|---|
| 4,400,587 | 8/1983 | Taylor et al. | 379/113 |
| 4,737,983 | 4/1988 | Frauenthal et al. | 379/221 |
| 4,788,715 | 11/1988 | Lee | 379/84 |
| 4,829,563 | 5/1989 | Crockett et al. | 379/309 |
| 4,953,204 | 8/1990 | Cuschleg, Jr. et al. | 379/309 |
| 5,206,903 | 4/1993 | Kohler et al. | 379/309 |
| 5,247,569 | 9/1993 | Cave | 379/309 |
| 5,278,898 | 1/1994 | Cambray et al. | 379/309 |
| 5,291,552 | 3/1994 | Kerrigan et al. | 379/266 |
| 5,295,184 | 3/1994 | Smith et al. | 379/266 |
| 5,299,259 | 3/1994 | Otto | 379/266 |
| 5,309,513 | 5/1994 | Rose | 379/266 |
| 5,327,490 | 7/1994 | Cave | 379/266 |
| 5,335,269 | 8/1994 | Steinlicht | 379/309 |
| 5,384,841 | 1/1995 | Adams et al. | 379/266 |
| 5,506,898 | 4/1996 | Costantini et al. | 379/309 |
| 5,524,147 | 6/1996 | Bean | 379/309 |
| 5,546,452 | 8/1996 | Andrews et al. | 379/219 |
| 5,590,188 | 12/1996 | Crockett | 379/225 |
| 5,633,924 | 5/1997 | Kaish et al. | 379/266 |

OTHER PUBLICATIONS

G. W. Gawrys, *Ushering In The Era Of ISDN*, AT&T Technology 1986, vol. One, No. One, pp. 2-9.

*Primary Examiner*—Daniel S. Hunter
*Assistant Examiner*—Scott Wolinsky
*Attorney, Agent, or Firm*—David Volejnicek

[57] ABSTRACT

A call-center ACD switch and queuing method are modified either to respond to an arriving call by determining, for those splits that could handle the call, the present values of a parameter that defines what is a best split for handling the call, determining from those present values which split is the best split for handling the call, and then enqueuing the call in the call queue of the best split, or to respond to a call that overflows the call queue of its primary agent split by determining which backup split in which call center is the best backup split for the call, and enqueuing the call in the call queue of the best backup split. Any desirable criteria may be used to determine the best split. A preferred criterion is queue waiting time: the best split is the one whose call queue offers the shortest in-queue waiting time. The waiting time may be either the real estimated waiting time (EWT), or the EWT weighted for other factors (WEWT) A programmable queuing control function directs the ACD switch to obtain, for each call, the EWTs of the splits, to weight these EWTs in order to obtain the corresponding WEWTs, to compare the WEWTs with each other in order to find the split with the shortest WEWT (the best split), and then to enqueue the call in the queue of this best split.

40 Claims, 6 Drawing Sheets

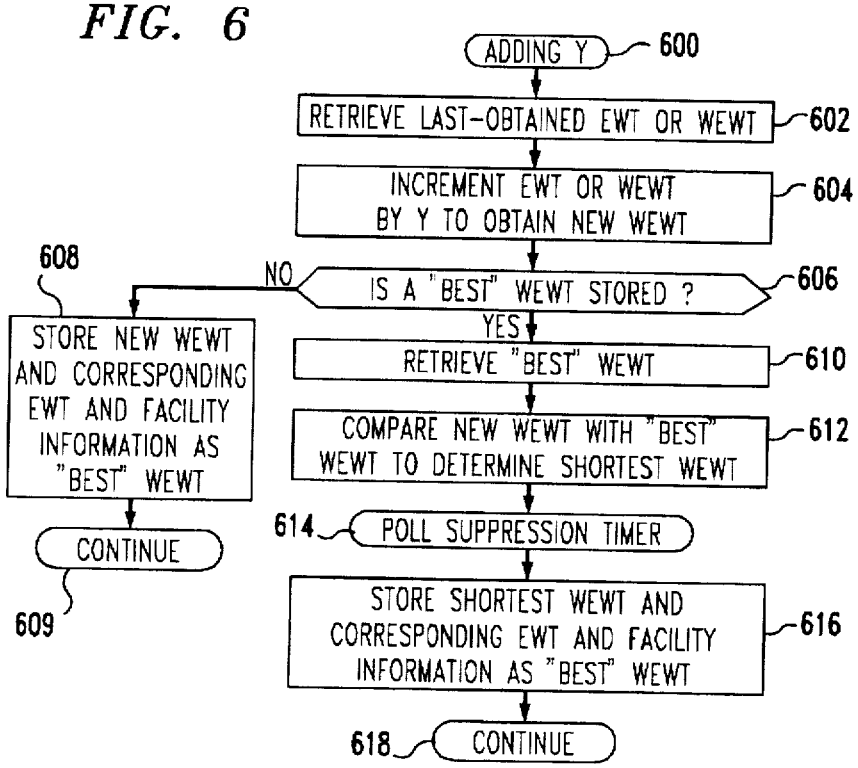
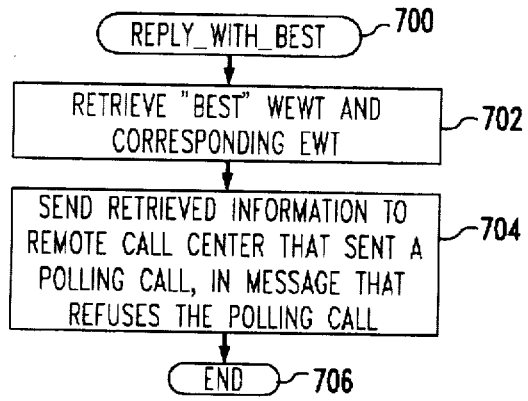
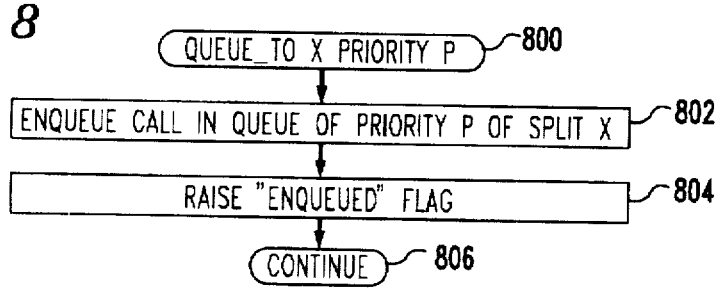

METHOD AND APPARATUS FOR QUEUING A CALL TO THE BEST SPLIT

CROSS-REFERENCE TO RELATED APPLICATION

This application is related to co-pending application Ser. No. 08/552,641 of A. D. Flockhart et al., entitled "Method and Apparatus for Queuing a Call to the Best Backup Split", filed on Nov. 3, 1995 and assigned to the same assignee as this application.

TECHNICAL FIELD

This invention relates generally to call centers, also alternatively known as telecenters and automatic call distribution systems, and relates specifically to queuing of calls in call centers.

BACKGROUND OF THE INVENTION

Call centers are systems that enable a pool of agents to serve incoming and/or outgoing calls, with the calls being distributed and connected to whichever of the agents happen to be available at the time. When no agents are free and available to handle additional calls, additional incoming calls are typically placed in a holding queue—they are enqueued—to await agents becoming available. It is common practice to divide the pool of agents into a plurality of groups, commonly referred to as splits, and to assign different types of calls to different splits. For example, different splits may be designated to handle calls pertaining to different client companies, or calls pertaining to different products or services of the same client company. Alternatively, the agents in different splits may have different skills—different language skills, for example—and calls requiring different ones of these skills are then directed to different ones of these splits. Each split typically has its own incoming-call queue.

Furthermore, some large companies find it effective to have a plurality of call centers, each for handling calls within a different geographical area, for example. Each call center, or each split within each call center, typically has its own incoming-call queue.

In a multiple-queue environment, it can happen that one call center or split is heavily overloaded with calls and has a full queue of calls waiting for an available agent, while another call center or split may be only lightly overloaded, and yet another call center or split may not be overloaded at all and actually may have idle agents. To alleviate such inefficiencies, some call centers have implemented a capability whereby, if the primary (preferred) split or call center for handling a particular call is heavily overloaded and its queue is overflowing with waiting calls, the call center evaluates the call load of other (backup) splits or call centers to determine if one of the other splits or call centers is less busy and consequently—although it is not as suited for a call as the primary split or call center—may nevertheless be able to handle the overflow call and do so more promptly. The overflow call is then queued to the first such backup split or call center that is found, instead of being queued to the primary split or call center. Such arrangements are known by different names, one being "lookahead interflow".

A problem with some of these arrangements is that they are sequential, and typically result in the overflow call being queued to the first acceptable split or call center, which may not be the best—the optimal—of the splits or call centers. Hence, inefficiencies remain. Other arrangements are non-sequential, but in order to limit the amount of additional processing or inter-call-center communications which such arrangements entail, they typically update their information on the call loads of individual splits or call centers only periodically and then use this information throughout the interval between updates. This can lead to system instability, wherein a split or call center that, at last update, was either underloaded or only slightly overloaded, receives so many calls during the interval between updates that it, in turn, becomes heavily overloaded and unable to accommodate further calls—even those for which it is the preferred split or call center. Hence, such arrangements can actually lead to increased call center inefficiency if they are not carefully engineered!

In an effort to avoid these problems, some call centers have adopted a multiple-queuing approach, wherein each call is queued to every split or call center that could handle the call, and is removed from all queues as soon as an agent in one of those splits or call centers accepts the call. This approach creates its own problems however, such as very heavy usage of inter-center tie-trunks, potential for call-delivery delays (to agents), phantom calls (where more than one agent requests delivery of the same call), etc. Furthermore, this approach occupies call positions in multiple queues with each call, and hence can very rapidly lead to overflow of those queues, again resulting in increased inefficiencies. And even if the approach makes use of two queues for each split or call center, one queue for calls for which the split or call center is primary and the other queue for calls for which the split or call center serves as a backup, it requires so much additional processing and inter-queue or inter-call center signaling that call center performance is likely to be adversely affected thereby.

Therefore, what the art needs but lacks is an arrangement for determining which of a plurality of call-handling resources (e.g., splits or call centers)—whether local or remote, or primary or backup—is presently either the best overall resource or the best backup resource for handling a call, and one which does so efficiently, without adversely impacting system performance and introducing inefficiencies of its own. Factors (also referred to herein as parameters or criteria) which define which resource is the best for a call are varied and can be chosen by the customer. For example, factors which may be used to define which agent split or call center is best for handling an incoming call include anticipated in-queue waiting time, call-center or split occupancy level, availability of agents, agents' skill levels, and tie-trunk cost.

SUMMARY OF THE INVENTION

This invention is directed to solving these and other problems and meeting these and other needs of the art. Generally according to the invention, when a call arrives, the best one of a plurality of call-handling facilities (e.g., agent splits) for the call is determined from the present (e.g., real-time) values of at least one parameter of the plurality of call-handling facilities (e.g., in-queue waiting time, agent availability) that has been predesignated to define a best call-handling facility, and the call is then directed to that best call-handling facility. The call is not sent to just any available facility, or to the first available facility, or even to all usable facilities. Rather, intelligence is applied to select a best facility for the call, using any desirable criteria—and preferably the present, real-time, values of those criteria—of what constitutes "best", and the call is sent to that best one of the facilities for handling the call.

Specifically according to the invention, a method and an apparatus for distributing calls in a call-handling system that has, for each one of a plurality of calls, a plurality of call-handling facilities, responds to arrival of a call for handling by the call-handling system by determining current values of a parameter of the call's plurality of call-handling facilities. The parameter is one that has been predetermined to define what is a best call-handling facility. The method or apparatus then determines, from the parameter's present values, the best one of the plurality of call-handling facilities for the call, and directs the call to the determined best call-handling facility. Illustratively, the present values of the parameter indicate how expeditiously individual ones of the call-handling facilities will handle the call, and the call is directed to the call-handling facility that will handle it most expeditiously. Also illustratively, handling the call expeditiously involves handling the call within an acceptable (e.g., predetermined) period of time, and the best call-handling facility is the one which will handle the call within the shortest period of time—either real estimated time or the real estimated time weighted by some weighting factor.

The invention is particularly useful in call center applications. Illustratively, each call-handling facility is either a different call center, or a different split of call-center agents of one or more call centers. Each call-handling facility has its own corresponding call queue for holding calls that are to be handled by that facility. When a call arrives, the best facility for handling the call is determined, and the call is enqueued in the call queue of the best facility.

Preferably, when a call arrives at a local call-handling facility (e.g., a local call center), a determination is made of whether facilities are available for connecting the call to a remote call-handling facility (e.g., a remote call center), and if not, that remote facility is designated as the worst call-handling facility for the call. Thus, a call-handling facility is not selected as the best call-handling facility, even if it should meet all other criteria for being selected as the best call-handling facility, if the call cannot be connected thereto. Also preferably, when the call arrives at a call-handling facility, a determination is made of which ones of the other facilities are presently unlikely to be a best facility for the call (for example, because their in-queue call-waiting times are already much too long), and the best facility is determined from among the facilities other than said ones of the facilities. Thus, the effort of determining whether a facility is the best facility is not wasted on facilities that have no reasonable chance of being the best facility.

These and other advantages and features of the invention will become more apparent from the following description of an illustrative embodiment of the invention taken together with the drawing.

BRIEF DESCRIPTION OF THE DRAWING

FIG. 6 is a flow diagram of operations performed by the ACD switch of FIG. 2 in response to a queuing-control "adding" command;

FIG. 7 is a flow diagram of operations performed by the ACD switch of FIG. 2 in response to a queuing-control "reply_with_best" command;

FIG. 8 is a flow diagram of operations performed by the ACD switch of FIG. 2 in response to a queuing-control "queue_to" command;

DETAILED DESCRIPTION

Figure 1:
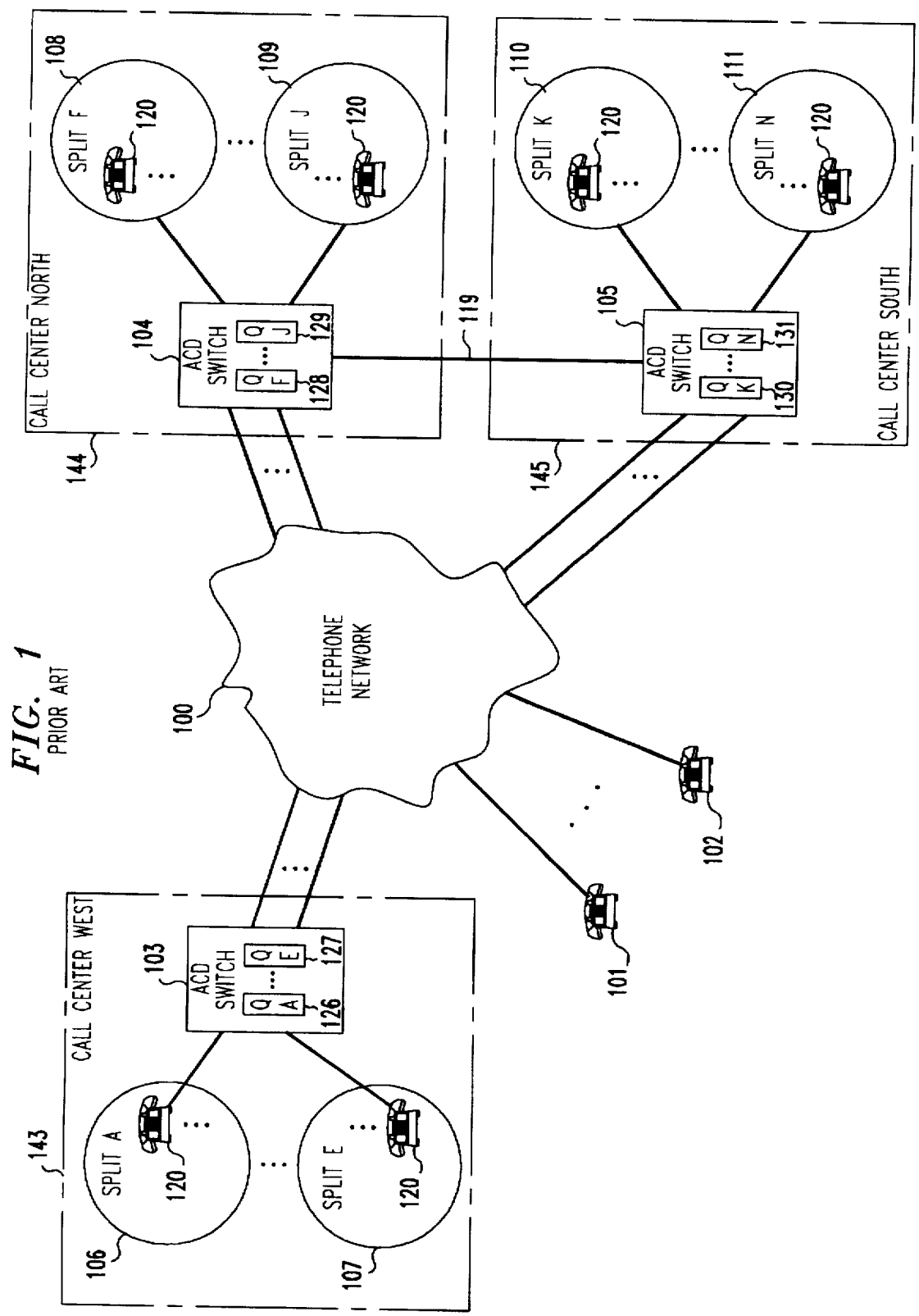
FIG. 1 is a block diagram of a prior-art call-center system.

FIG. 1 shows a conventional call-center system. A call-center system comprises at least one call center. In this illustrative example, the call-center system comprises a plurality—three, in this example—networked call centers 143–145 respectively designated as "west", "north", and "south". Call centers 143–145 are interconnected with each other, and with telephones 101–102 of callers who are potential users of call centers 143–145, via a telephone network 100. Each call center 143–145 comprises an automatic call distribution (ACD) switch 103–105, respectively, and a plurality of agent position terminals 120, such as telephones. ACD switches 103–105 connect terminals 120 to telephone network 100. ACD switches 104 and 105 of call centers 144 and 145 are additionally shown as being directly connected with each other via a dedicated trunk, voice link, or data link, 119. In each call center 143–145, the agents and their terminals 120 are divided into one or more splits 106–107, 108–109, and 110–111, respectively, and the respective ACD switch 103–105 defines a waiting-call queue 126–127, 128–129, and 130–131, for each of the splits 106–107, 108–109, and 110–111, respectively. Additionally, any one or more of the queues 126–131 may comprise a plurality of priority queues, each for holding waiting calls of a different priority (not shown).

Figure 2:
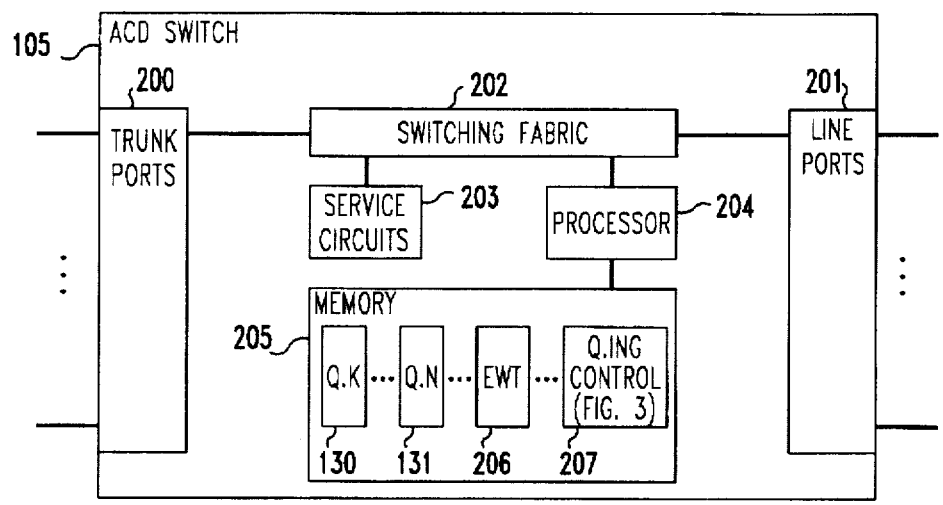
FIG. 2 is a block diagram of a representative ACD switch of the network of FIG. 1 that has been modified to include an illustrative implementation of the invention.

FIG. 2 shows ACD switch 105 in greater detail. ACD switch 105 is representative of all ACD switches 103–105. ACD switch 105 conventionally includes trunk ports 200 for connecting ACD switch 105 to telephone network 100; line ports 201 for connecting ACD switch 105 to agent terminals 120; service circuits 203 that provide various services, such as tone generators, announcement generators, hold circuits, conference circuits, modems, etc.; a switching fabric 202 that selectively interconnects ports 200, ports 201, and service circuits 203; a processor 204 that controls switching fabric 202 and other elements of ACD switch 105; and a memory 205 which holds control programs and data which processor 204 executes and uses to control the operation of ACD switch 105. Memory 205 includes queues 130–131 for splits 110–111, respectively, and an estimated waiting time (EWT) function 206 which computes the amount of time that a call is likely to spend in any one of the queues 130–131 before being taken out of that queue, e.g., before being connected to an agent's terminal 120. Switch 105 is illustratively the Lucent Technologies Inc. Definity® ACD private branch exchange (PBX). EWT function 206 may be any suitable EWT function—such as the one described in U.S. Pat. No. 4,788,715, for example—but is preferably the EWT function described in application of R. J. Costantini et al., entitled "Expected Wait-Time Indication Arrangement", application Ser. No. 08/273667, filed on Jul. 12, 1994, which issued as U.S. Pat. No. 5,506,898 on Apr. 9, 1996, and is assigned to the same assignee as this application, which is hereby incorporated herein by reference.

Figure 3:
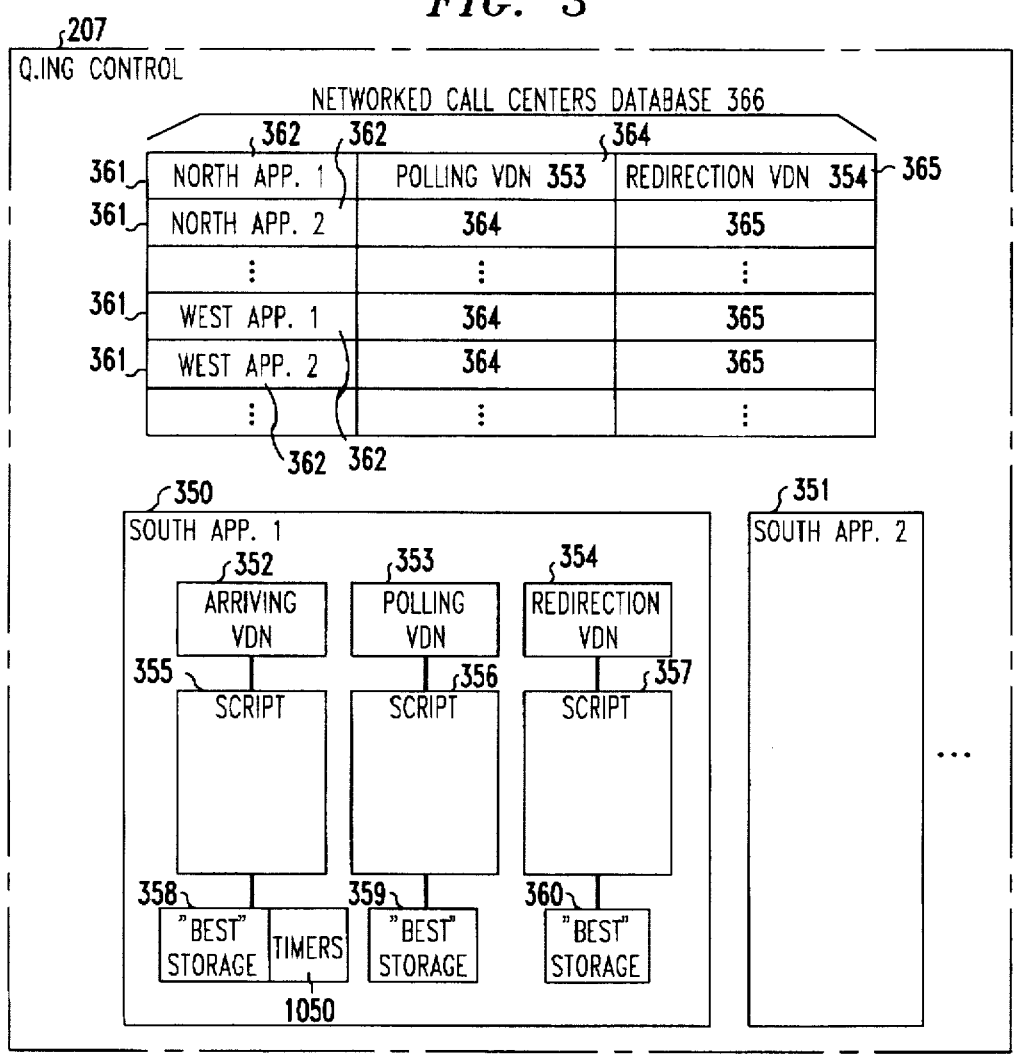
FIG. 3 is a block diagram of a queuing-control function of the ACD switch of FIG. 2.

According to the invention, memory 205 further includes queuing control function 207, which is shown in greater detail in FIG. 3.

Call center 145 serves a plurality of call-handling applications 350–351; for example, sales-call-handling, service-call handling, accounting-inquiry-call handling, etc. For each of these applications, call center 145 conventionally has a different telephone number, referred to herein as an arriving vector directory number (VDN) 352. A customer call that newly arrives at call center 145 is directed to the arriving VDN 352 of the one of the applications 350–351 to which that call corresponds. According to the invention, two other VDNs are added to each application 350–351; a polling VDN 353 and a redirection VDN 354. Each VDN of the VDN trio 352–354 of each application 350–351 has associated with it a respective script—a program—355–357. Each script 355–357 implements a find-a-"best"-split function. Preferably, a script 355–357 of an application is executed whenever call center 145 receives a call for that script's corresponding VDN 352–354. Queuing control function 207 of each call center 143–145 is structured in the same manner.

In order for call center 145 to know what the applications and their corresponding polling and redirection VDNs are of every other call center 143–144 with which it is networked, queuing control function 207 further includes a database 366 of information about networked call centers 143–144. Database 366 has a plurality of entries 361, one for each application 350–351 of each call center 143–144. Each entry 361 has a field 362 that identifies the corresponding call center and application, and two fields 364–365 which identify the polling VDN 353 and the redirection VDN 354, respectively, that correspond to that application. Also, each script 355 that corresponds to an arriving VDN 352 has zero or more timers 1050 associated therewith, one for each remote call center 143–144. Their use will be made clear below. Queuing control function 207 of each call center 143–145 is structured in the same manner.

As was mentioned above, each script 355–357 implements a find-a"best"-split function. Any desirable criterion or criteria may be used to determine which split is "best" for a call. In this illustrative example, the principal criterion that is used to determine the "best" split is queue waiting time: the "best" split is taken to be the one whose queue offers the shortest waiting time. The waiting time may be either the real estimated waiting time (EWT), or the EWT weighted for other factors—the cost of facilities involved in connecting a call to the split's corresponding queue, for example, or a desire to retain the call for the preferred split unless its queue's waiting time can be improved elsewhere by a predetermined minimum amount. A find-a-"best"-split function allows an ACD switch to obtain, for each arriving call, the EWTs in queues of selected splits in this and/or other call centers, to weight these EWTs in order to obtain the weighted EWTs (WEWTs), to compare the WEWTs with each other in order to determine the "best" split, and to enqueue the call in the queue of the "best" split, if desired. Each find-a-"best"-split function is administratively programmable, illustratively via a scripting language that includes the commands listed in Table A.

TABLE A

| command | argument |
| --- | --- |
| consider_split | identifier of the local call center's split and priority level whose WEWT is to be taken into consideration in determining the "best" split; a split that is determined to have an EWT of zero is automatically deemed to be the best split |
| consider_remote_site | identifier of a remote call center whose best WEWT is to be taken into consideration in determining the "best" split; a remote call center that is determined to have a split with an EWT of zero is automatically deemed to be the "best" call center and split |
| reply_with_best | no argument - results in the remote call center's polling call being rejected and the local call center's best WEWT and corresponding EWT being returned to the remote call center that requested it via the polling call |
| adding | the weighting factor that is to be added to an EWT or a WEWT to obtain a WEWT |
| queue_to | the identifier of the local split and priority level to which a call is to be queued, either temporarily or permanently |
| queue_to_best | no argument - results in queuing of a call to the best split from those specified by the consider_split and consider_remote_site commands |
| check_backup_split_best_if | the condition that must be met for the command to be executed; if the condition is met, the command is executed as if it were a queue_to_best command, and if the condition is not met, execution of the command is skipped - this command is normally used in conjunction with a "queue_to" command that precedes it in the script command sequence, and it is a conditional alternative to the queue_to_best command |

An illustrative script 355–357 for a call whose preferred split is split 110 (split K) may be as follows:

consider_split K priority p
    consider_split N priority p adding 5
    consider_remote_site north adding 15
    consider_remote_site west adding 15
    queue_to_best This script is illustrative of a script 355 that corresponds to an arriving VDN 352. It is preferably executed whenever a call arrives at call center 145 for arriving VDN 352 of application 350. A summary of its execution goes as follows. In response to the first command, processor 204 obtains the EWT for queue 130 at a priority level p of split 110—the preferred split for calls arriving at arriving VDN 352 of application 350—from EWT function 206 and effectively checks if it is zero, i.e., no waiting. If it is zero, processor 204 effectively ignores the rest of the "consider" commands and then queues the call at priority p to split 110 in response to the last, "queue_to_best", command. If it is not zero, processor 204 saves the EWT and facility information of split 110 as the "best" WEWT. The facility information for a local split, such as split 110, is the split's ID and the priority level of that split's queue for which the EWT was determined. Processor 204 then responds to the second command. In response to the second command, processor 204 obtains the EWT for queue 131 at the priority level p of split 111—the first backup split—from EWT function 206 and checks if it is zero. If it is zero, processor 204 effectively ignores the rest of the "consider" commands and then queues the call to split 111 at priority p in response to the "queue_to_best" command. If it is not zero, processor 204 responds to the accompanying "adding" command and adds 5 seconds to the EWT of queue 131 to obtain its WEWT, and then compares it with the previously-stored "best" WEWT (the EWT of split 110; the WEWT of split 110 is the same as the EWT of split 110, because the first, "consider_split K priority p", command was not accompanied by an "adding" command). The comparison indicates which of the two WEWTs is shorter, and processor 204 stores the shorter WEWT and the corresponding EWT and facility information as the "best" WEWT and discards the longer WEWT. Processor 204 then responds to the next command. Processor 204 looks up in database 366 the entry 361 of the same application 350, but in call center 144, for which the call arrived at call center 145, and retrieves therefrom polling VDN 353 of that application 350 in call center 144. Processor 204 then generates a polling call to call center 144 for that polling VDN 353. ACD switch 104 of call center 144 responds to this polling call from call center 145 by executing script 356 which corresponds to this call's polling VDN 353 in call center 144. Script 356 of a polling VDN 353 is typically constructed from "consider_split" and "adding" commands, except that it terminates with a "reply_with_best" command. This command is always executed—it is never ignored. Execution of script 356 determines the "best" split from among the splits 108-109 of call center 144. By execution of the "reply_with_best" command, ACD switch 104 refuses the polling call from call center 145 and returns to call center 145 the WEWT and the EWT of the "best" split in call center 144. Processor 204 of ACD switch 105 of call center 145 effectively checks the EWT returned from call center 144 to see if it is zero. If it is zero, processor 204 effectively ignores the rest of the script's "consider" commands and then in response to the "queue_to_best" command it looks up the redirection VDN 354 in the same database entry 361 from which it had previously obtained the polling VDN 353, and directs the arrived call to this redirection VDN 354 at call center 144. Processor 204 of ACD switch 104 of call center 144 responds to this redirected call from call center 145 by executing script 357 which corresponds to this call's redirection VDN 354 in call center 144. Script 357 of a redirection VDN 354 is typically constructed from "consider_split" and "adding" commands, except that it terminates with a "queue_to_best" command. Execution of script 357 redetermines the "best" split from among the splits 108-109 of call center 144 and queues the redirected call to that "best" split.

If the EWT returned by call center 144 in response to the third "consider" command is not zero, execution of the accompanying "adding" command leads processor 204 of ACD switch 105 of call center 145 to add 15 seconds to the WEWT returned by call center 144 to obtain a new WEWT. Processor 204 then compares this new WEWT with the previously-stored "best" WEWT. The comparison indicates which of the two WEWTs is shorter, and processor 204 stores the shorter WEWT and the corresponding EWT and facility information, and discards the longer WEWT. The facility information for a remote site, such as call center 144, is the remote site's ID. Processor 204 then responds to the next command. The functionality of this next command is the same as the functionality of the just-discussed "consider_remote_site_north" command, but has as its object the call center 143. Processor 204 then proceeds to execute the last, "queue_to_best", command of the script. Processor 204 checks facility information associated with the stored "best" WEWT to determine if it corresponds to a local or a remote split. If the "best" split is local, processor 204 queues the arrived call to that "best" split at the indicated priority; if the "best" split is remote, processor 204 directs the call to the corresponding redirection VDN 354 of the remote call center. Execution of the arriving VDN's script thus comes to an end.

An alternative sequence to the just-discussed sequence may be one which queues the arrived call to the call's primary split and then determines whether the WEWT may be improved by a certain predetermined minimum (e.g., 20 seconds) by queuing the call to a backup split. In this instance, the just-discussed sequence is modified by preceding the sequence with a "queue_to K priority p" command, which results in the call being queued at priority p to queue 130 of the call's primary split 110, and replacing the "queue-to-best" command with a "check_backup_split_best_if wait-improved≧20" command. In response to this latter command, processor 204 adds 20 seconds to the EWT of the "best" split and compares the modified "best" EWT with the EWT of the arrived call in the queue in which the arrived call is presently enqueued. (The 20 seconds is, consequently, a weighting factor, equivalent to that effected by an "adding" command, and the result is a form of a WEWT.) If the modified "best" EWT exceeds the EWT of the call, processor 204 continues execution of script 355, leaving the call enqueued in queue 130. If the EWT of the call equals or exceeds the modified "best" EWT, processor 204 executes the command as if it were the above-described "queue_to_best" command.

Yet another alternative is that, whenever a call arrives at call center 145 for arriving VDN 352 of application 350, it is automatically queued, or is automatically attempted to be queued, to that VDN's designated primary split 110. Only if it is subsequently determined that the call cannot be expeditiously handled by the primary split 110—for example, because the queuing attempt has failed on account of the arrived call overflowing the call queue 130 of the primary split 110—is the script 355 that corresponds to the arriving VDN 352 executed to find the best backup split for the call.

Figure 4:
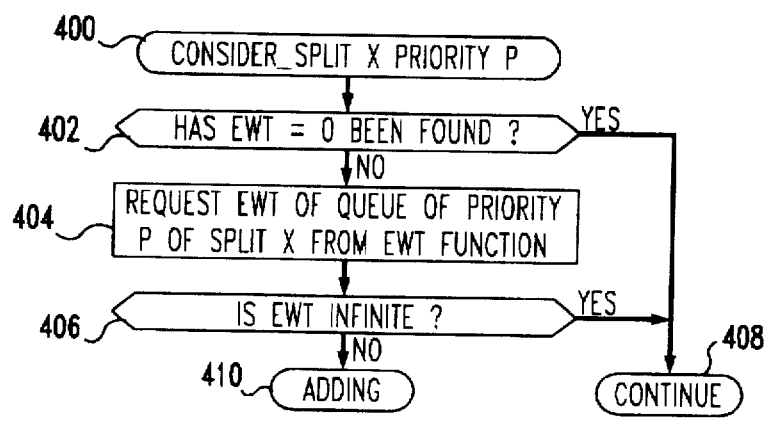
FIG. 4 is a flow diagram of operations performed by the ACD switch of FIG. 2 in response to a queuing-control "consider_split" command.

FIGS. 4-10 represent the functionality of the commands that are listed in Table A. FIG. 4 shows that, in response to receipt of the "consider_split" command with an argument of split ID "X priority p", at step 400, processor 204 examines the contents of the one of "best" storage areas (see items 358-360 in FIG. 3) that the script of which this command is a part uses to store information on the "best" split or call center, to determine if a split with an EWT of zero has already been found, at step 402. If so, the "best" EWT cannot be improved upon by this "consider_split" command, and so processor 204 merely continues execution of the script of which this command is a part, at step 408. But if it is determined at step 402 that a split with an EWT of zero has not yet been found, processor 204 requests EWT function 206 to provide the EWT of the queue of local split X at priority p, at step 404. Upon receipt of the EWT from EWT function 206, processor 204 checks whether the EWT is infinite, at step 406. If so, this "consider_split" command cannot produce the "best" EWT, and so processor 204 merely continues execution of the script of which this command is a part, at step 408. If the EWT of split X at priority p is not infinite, as determined at step 406, processor 204 continues script execution with the associated "adding" command, at step 410. Lack of an associated "adding" command is treated as an "adding 0" command. Functionality of the "adding" command is shown in FIG. 6.

Figure 5:
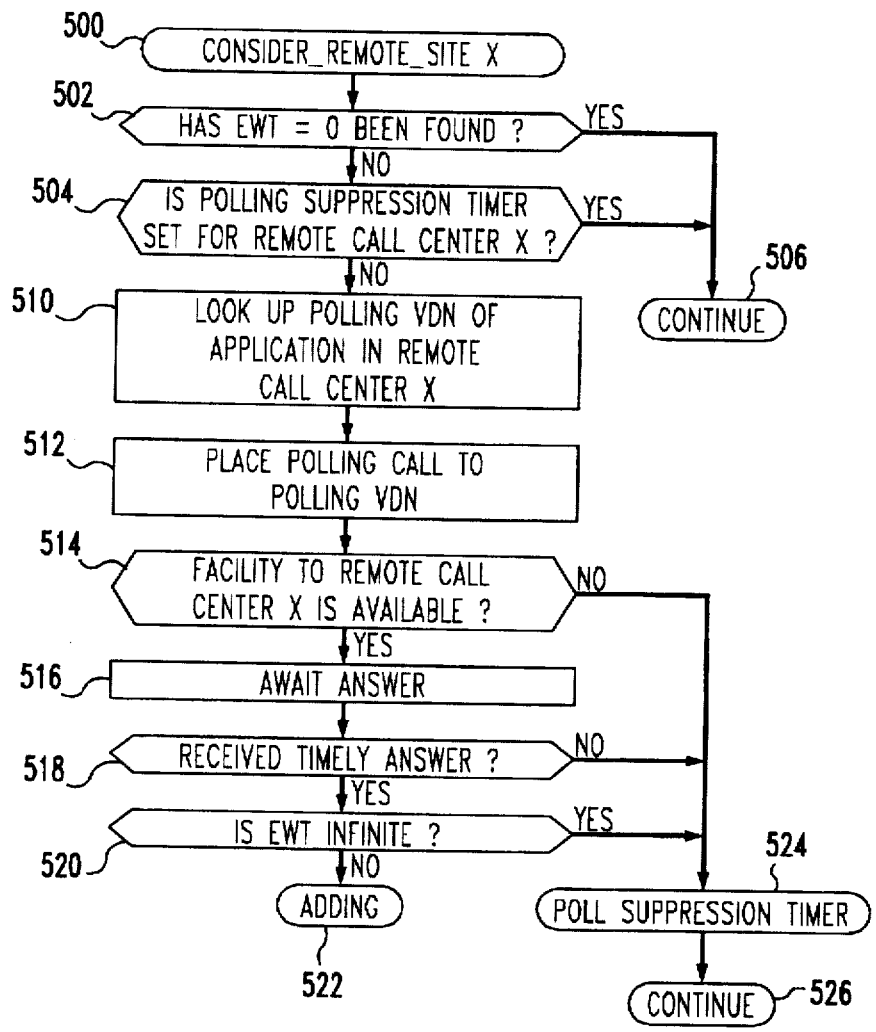
FIG. 5 is a flow diagram of operations performed by the ACD switch of FIG. 2 in response to a first implementation of a queuing-control "consider_remote_site" command.
Figure 11:
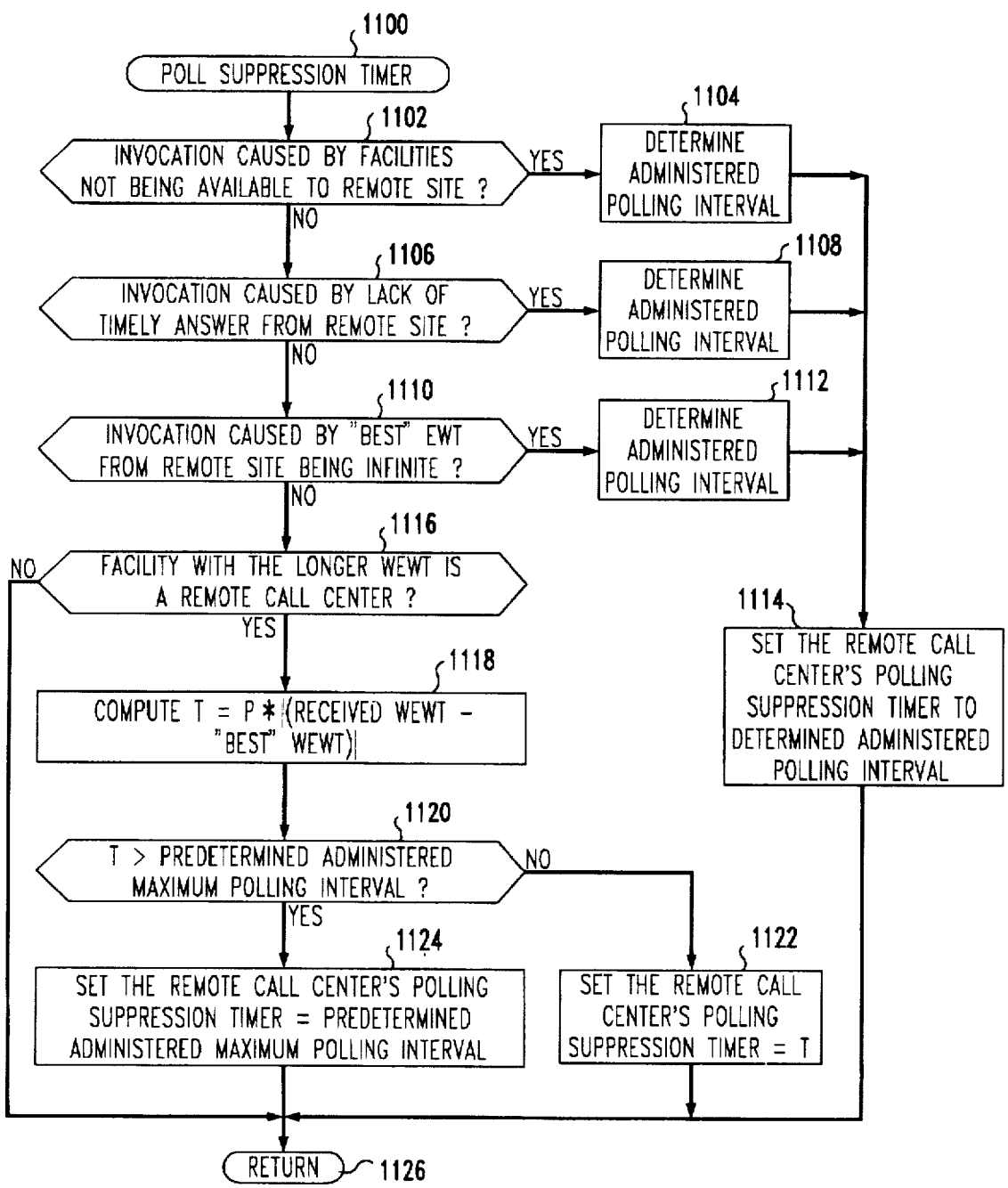
FIG. 11 is a flow diagram of operations performed by the ACD switch of FIG. 2 in response to encountering a "poll suppression timer" command as a part of executing a "consider_remote_site" command of FIG. 5 or an "adding" command of FIG. 6.

FIG. 5 shows that, in response to receipt of the "consider_remote_site" command with an argument of call center ID "X", at step 500, processor 204 examines the contents of the "best" storage area 358 that the script 355 of which this command is a part uses to store information on the "best" split or call center, to determine if a split with an EWT of zero has already been found, at step 502. If so, the "best" EWT cannot be improved upon by this "consider_ remote_site" command, and so processor 204 merely continues execution of the script 355 of which this command is a part, at step 506. But if it is determined at step 502 that a split with an EWT of zero has not yet been found, processor 204 checks the one of polling suppression timers 1050 which is associated with the remote call center X (see FIG. 3) to determine if it is set (i.e., timing) or expired, at step 504. Timer 1050 is used because the polling of the remote call center X (at step 512) has costs associated therewith, both in terms of processing and waiting time and in terms of use of inter-call-center communications facilities. To reduce these costs, it is desirable to poll remote call center X only if it realistically has a chance of presently being the "best" call center for handling the call. For this reason, the "consider_remote_site" command effects intelligent polling whereby the frequency of polling of a remote call center X is directly proportional to the likelihood of remote call center X being the "best" call center. In this illustrative example, the likelihood is considered to be inversely proportional to a multiple of the amount of time by which the last-determined "best" WEWT of remote call center X exceeds the last-determined overall "best" WEWT. This is the function effected by polling suppression timers 1050. If timer 1050 that is associated with the remote call center X is set, it is not yet time to poll remote call center X again, and so processor 204 merely continues execution of the script 355 of which this command is a part, at step 506. If it is determined at step 504 that timer 1050 for remote call center X is expired, it is time to poll remote call center X again, and so processor 204 looks up in database 366 the polling VDN 353 in call center X of the arrived call's application, at step 510, and then sends a polling call (e.g., a lookahead interflow call) to that polling VDN 353, at step 512. However, facilities (e.g., call channels) for connecting the call to the remote call center X may not presently be available: all those facilities may presently be occupied by other calls, or may be temporarily out of service, etc. To take this eventuality into consideration, processor 204 checks, at step 514, if its attempt at step 512 to launch a polling call to the remote call center X failed because facilities for connecting the call to the remote call center X are presently unavailable. If so, processor 204 proceeds to step 524 to service the polling suppression timer 1050. Functionality of the servicing is shown in FIG. 11. Upon return therefrom, processor 204 continues execution of the script of which this command is a part, at step 526, skipping execution of the "adding" command at step 522 and thereby taking the splits of remote call center x out of contention for being the best backup split. If processor 204 finds at step 514 that its polling call to remote call center X did not fail, processor 204 waits for an answer to the polling call, at step 516.

Receipt of the polling call at the remote call-center X triggers execution in the remote call-center X of the script 356 that corresponds to the call's polling VDN 353 in call center X. Execution of that script 356 ends with execution of the "reply_with_best" command. FIG. 7 shows that, in response to receipt of the "reply_with_best" command, at step 700 processor 204 retrieves the contents of the "best" storage area that is used by the script of which this command is a part to store the information about the "best" split, at step 702. This storage contains not only the determined local "best" WEWT, but also the corresponding EWT from which the local "best" WEWT was created and the priority level and the identity of the local split to which the local "best" WEWT corresponds. Processor 204 takes the retrieved EWT and WEWT and places them in a message that refuses the polling call that triggered execution of the script of which this command is a part, and sends the refusal message back to the remote call center that originated the polling call, at step 704. Execution of the script of which this command is a part then ends, at step 706.

This refusal message is the answer awaited at step 516 of FIG. 5. If the answer either does not arrive from remote call center X at all, or does not arrive in a timely manner, as determined at step 518, processor 520 proceeds to steps 524 et seq. If the answer does arrive from remote call enter X in a timely manner, as determined at step 518, the answer includes the remote call center's "best" WEWT and the corresponding EWT, and processor 204 checks whether the received EWT is infinity, at step 520. If so, processor 204 proceeds to steps 524 et seq.; if not, processor 204 continues script execution with the associated "adding" command, at step 522. Lack of an associated "adding" command is treated as an "adding 0" command. Functionality of the "adding" command is shown in FIG. 6.

FIG. 6 shows that, in response to receipt of the "adding" command with an argument of "Y", at step 600, processor 204 retrieves the last-obtained EWT (see step 404 of FIG. 4) or WEWT (see step 516 of FIG. 5), at step 602, and increments that EWT or WEWT by the value of Y to obtain a new WEWT, at step 604. Processor 204 then checks contents of the "best" storage area that is used by the script of which this command is a part for storing the present "best" WEWT and associated information to determine if it has stored a "best" WEWT, at step 606. If it has not stored a "best" WEWT, processor 204 stores the new WEWT and its corresponding EWT and facility information in the "best" storage area as the "best" WEWT, at step 608, and then continues script execution with the next sequential command, at step 609. Returning to step 606, if it is determined there that a "best" WEWT is stored, processor 204 retrieves the "best" WEWT from the "best" storage area, at step 610, and compares it with the new WEWT to determine which is shorter, at step 612. Processor 204 then invokes execution of the polling suppression timer service routine for the remote call center, at step 614. Functionality of this routine is shown in FIG. 11. Upon return from execution of the routine of FIG. 11, processor 204, stores the shorter WEWT and its corresponding EWT and facility information as the "best" WEWT in "best" WEWT storage, at step 616, and then continues script execution with the next sequential command, at step 618.

FIG. 8 shows that, in response to receipt of the "queue_ to" command with an argument of split ID "X priority p", at step 800, processor 204 enqueues the subject arrived call in the queue of split X at priority p, at step 802, and also sets an "enqueued" flag to indicate that the arrived call has been enqueued, at step 804 Processor 204 then continues execution of the script of which this command is a part, at step 806.

Figure 9:
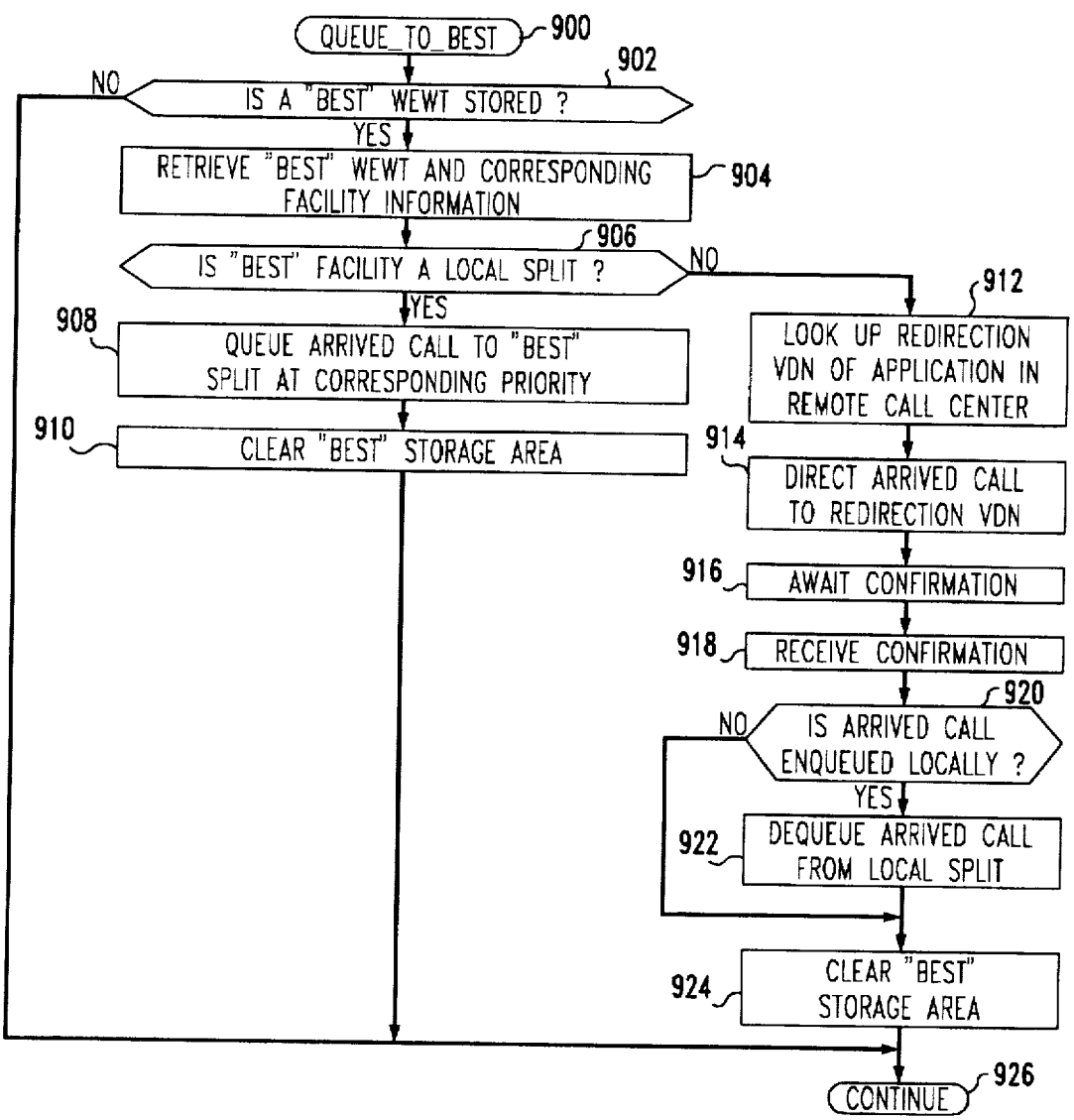
FIG. 9 is a flow diagram of operations performed by the ACD switch of FIG. 2 in response to a queuing-control "queue_to_best" command.

FIG. 9 shows that, in response to receipt of the "queue_ to_best" command, at step 900, processor 204 checks the contents of the "best" storage area of the script of which this command is a part to determine if a "best" WEWT has been found and stored, at step 902. If not, there is no "best" split to queue the arrived call to, and so processor 204 merely continues execution of the script of which this command is a part, at step 926. But if a "best" WEWT is stored, as a consequence of executing any preceding "adding", "consider_split", and "consider_remote_site" commands in the sequence, processor 204 retrieves the "best" WEWT along with its corresponding facility information, at step 904. Processor 204 then checks whether the facility that corresponds to the "best" WEWT is a local split, at step 906. If so, processor 204 queues the call to the local "best" split at the priority level that correspond to the "best" WEWT, at step 908. Processor then clears the contents of the "best" storage area of the script that includes this command, at step 910, and continues execution of that script, at step 926.

Returning to step 906, if it is determined there that the facility which corresponds to the "best" WEWT is a remote call center, processor 204 looks up in database 366 the redirection VDN 354 of the arrived call's application in the remote call center, at step 912, and then redirects the arrived call to that redirection VDN 354, at step 914. Processor 204 then awaits receipt of confirmation of the redirection from the remote call center, at step 916. Upon receipt of the confirmation, at step 918, processor 204 checks the "enqueued" flag (see step 804 of FIG. 8) to determine if the arrived call is queued locally as a result of any preceding "queue_to" command, at step 920. If the call is locally queued, processor 204 dequeues it from the local split's queue, at step 922. Following step 922, or if the call is not locally queued, processor 204 clears contents of the "best" storage area of the script of which this "queue_to_best" command is a part, at step 924, and then continues execution of that script, at step 926.

Figure 10:
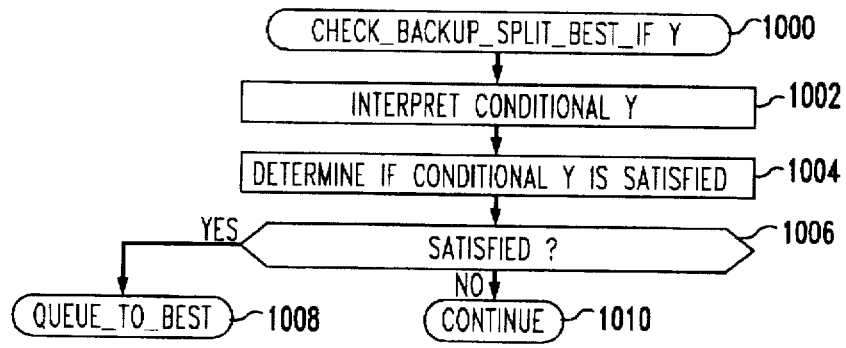
FIG. 10 is a flow diagram of operations performed by the ACD switch of FIG. 2 in response to a queuing-control "check_backup_split_best_if" command.

FIG. 10 shows that, in response to receipt of the "check_backup_split_best_if Y" command, at step 1000, processor 204, interprets the conditional Y that is the argument of the command, at step 1002, in order to determine what is required by conditional Y. Processor 204 then takes whatever steps (e.g., computations, determinations, and/or comparisons) that are necessary to evaluate conditional Y's requirements and to determine if those requirements are met, at step 1004. If the conditional's requirements are satisfied, as determined at step 1006, processor 204 proceeds to execute a "queue_to_best" command, at step 1008. If the conditional's requirements are not satisfied, processor 204 merely continues execution of the script of which this "check_backup_split_best_if" command is a part, at step 1010.

FIG. 11 shows that, in response to encountering the "poll suppression timer" command, at step 1100, as a part of executing either a "consider_remote_site" command (see step 524 of FIG. 5) or an "adding" command (see step 614 of FIG. 6) the action of processor 204 is determined by the reason why this command routine was invoked. If invocation is determined, at step 1102, to have been caused by a lack of available call facilities to the subject remote call center (see step 514 of FIG. 5), processor 204 looks up the administered value of a polling interval for this event, at step 1104, and sets timer 1050 that corresponds to the subject remote call center to that administered value, at step 1114. If invocation is determined at step 1106, to have been caused by a lack of receipt of a timely answer from the subject remote call center (see step 518 of FIG. 5), processor 204 looks up the administered value of a polling interval for this event, at step 1108, and then proceeds to step 1114. If invocation is determined, at step 1110, to have been caused by the EWT returned by the subject remote call center being infinity (see step 520 of FIG. 5), processor 204 looks up the administered value of a polling interval for this event, at step 1112, and then proceeds to step 1114. Following step 1114, processor 204 returns to the place of its invocation, at step 1126.

If invocation was not caused by one of the three events checked for at steps 1102, 1106, and 1110, invocation was not caused directly by execution of a "consider_remote_site" command of FIG. 5, but rather was caused by execution of an "adding" command of FIG. 6. Processor 204 therefore checks whether the facility that was determined, at step 612 of FIG. 6, to have the longer WEWT is a remote call center, at step 1116. If not, processor 204 merely returns to the point of invocation of the routine of FIG. 11, at step 1126; if so, processor 204 computes a value T equal to some predetermined (administratively programmable) multiple P of the absolute value of the difference between the WEWT that was received from that remote call center and the "best" WEWT (i.e., the shortest WEWT determined at step 612 of FIG. 6), at step 1118. Processor 204 then checks whether this value T exceeds an administered maximum value of a polling interval for this event, at step 1120. If the value of T exceeds the maximum value, processor 204 sets the timer 1050 that corresponds to the subject remote call center to that maximum value, at step 1124. If the value of T does not exceed the maximum value, processor 204 sets the timer 1050 that corresponds to the subject remote call center to the value of T, at step 1122. Following step 1122 or 1124, processor 204 returns to the place from where the routine of FIG. 11 was invoked, at step 1126.

Of course, various changes and modifications to the illustrative embodiment described above will be apparent to those skilled in the art. For example, a criterion other than EWT and WEWT may be used as the principal criterion in determining the "best" split—split occupancy or agent availability, for example. Also, each of the scripts may be replaced with a table of local and remote facilities and a corresponding "queue_to_best_in_table X" command. Such changes and modifications can be made without departing from the spirit and the scope of the invention and without diminishing its attendant advantages. It is therefore intended that such changes and modifications be covered by the following claims.

The invention claimed is:

1. A call-distribution arrangement for a call-handling system that has, for each one of a plurality of calls, a plurality of call-handling facilities, comprising:

first means in each one of a plurality of the call-handling facilities, each responsive to receipt of a call by its call-handling facility for handling by the call-handling system, for determining for each one of the call's plurality of call-handling facilities, the present value of a parameter predetermined to define what is a best call-handling facility;

second means in said each one call-handling facility, each responsive to a determination by its call-handling facility's fist means, for evaluating the present values to determine the best one of the plurality of call-handling facilities for the call; and third means in said each one call-handling facility, each responsive to a determination by its call handling facility's second means of the best call-handling facility for the call, for directing the call to the best call-handling facility.

2. The arrangement of claim 1 wherein:

each call-handling facility comprises a different split of call-center agents.

3. The arrangement of claim 1 wherein:

each call-handling facility comprises a different call center.

4. The arrangement of claim 1 wherein:

each call-handling facility comprises a different split of call-center agents of a plurality of call centers.

5. The arrangement of claim 1 wherein:

the present values of the parameter indicate how expeditiously individual ones of the call-handling facilities will handle the call; and each second means comprise fourth means responsive to a determination by its call-handling facility's first means of the present values of the parameter, for determining from the present values a call-handling facility that will handle the call most expeditiously, and each third means comprise means responsive to a determination by its call-handling facility's fourth means, for directing the call to the call-handling facility that will handle the call most expeditiously.

6. The arrangement of claim 1 wherein, the present values of the parameter indicate periods of time in which each of said call-handling facilities are likely to handle the call; and each second means comprise fourth means responsive to a determination by its call-handling facility's first means of the present values of the parameter, for determining from the present values a call-handling facility for the call, from among the call's plurality of call-handling facilities, which is likely to handle the call in a shortest period of time.

7. The arrangement of claim 1 wherein;

the present values of the parameter indicate periods of time in which each of said call-handling facilities are likely to handle the call; and each means comprise fourth means responsive to a determination by its call-handling facility's fit means of the present values of the parameter, for determining from the present values a call-handling facility for the call, from among the call's plurality of call-handling facilities, which is likely to handle the call in a shortest weighted period of time.

8. The arrangement of claim 1 wherein:

each call-handling facility has a corresponding call queue; and each third means comprise fourth means responsive to a determination by its call-handling facility's second means of the best call-handling facility for the call, for enqueuing the call in the call queue of the best call-handling facility.

9. The arrangement of claim 8 wherein:

each first means comprise fourth means for determining estimated waiting times of the call in the call queues of the call's call-handling facilities; and each second means comprise means for determining a call-handling facility having a shortest estimated waiting time of the call in the corresponding call-queue, as the best call-handling facility.

10. The arrangement of claim 8 wherein:

each first means comprise fourth means for determining weighted estimated waiting times of the call in the call queues of the call's call-handling facilities, and each second means comprise means for determining a call-handling facility having a shortest weighted estimated waiting time of the call in the corresponding call queue, as the best call-handling facility.

11. A call-center system comprising:

a plurality of agent splits for handling calls, a plurality of said splits being splits for handling an individual call;

a plurality of call queues corresponding to different ones of the splits, each for holding calls for handling by the corresponding split;

at least one call center that includes the plurality of the agent splits and the plurality of the call queues;

first means in each said call center, each responsive to receipt of the individual call by its call center, for determining for each one of the splits for handling the individual call, the present value of a parameter predetermined to define what is a best split for handling the individual call;

second means in each said call center, each responsive to a determination by the first means of its call center, for evaluating the present values to determine the best split for handling the individual call; and third means in each said call center, each responsive to a determination, by the second means of its call center, of the best split for handling the call, for effecting enqueuing of the individual call in the call queue of the best split.

12. The call-center system of claim 11 wherein:

the present values of the parameter indicate how expeditiously the splits for handling the individual call will handle the individual call;

each second means include means for determining which one of the splits for handling the individual call will handle the call most expeditiously; and each third means comprise fourth means responsive to a determination by the second means of its call center, for enqueuing the individual call in the call queue of the split that will handle the call most expeditiously.

13. The call-center system of claim 11 wherein:

each first means include fourth means for determining whether facilities are available for connecting the individual call to an individual split for handling the call, and each second means include fifth means responsive to a determination that facilities are not available for connecting the individual call to the individual split for handling the call, for taking the individual split out of contention for being the best split for handling the individual call.

14. The call-center system of claim 11 wherein:

each first means include fourth means for determining which ones of the splits for handling the individual call are presently unlikely to be a best split for handling the individual call; and fifth means responsive to a determination by the fourth means of its call center, for determining the present values of the parameter of only the splits for handling the individual call other than said ones of the splits.

15. The call-center system of claim 11 wherein:

the present values of the parameter indicate estimated waiting times of the individual call in queues of the splits for handling the individual call; and each second means comprise fourth means for determining a split for handling the individual call which has a shortest estimated waiting time of the individual call in its corresponding call queue, as the best split.

16. The call-center system of claim 15 wherein:

each first means comprise fifth means for determining an estimated waiting time of the individual call in the queue of a first split for handling the individual call, and responsive to the determined estimated waiting time of the individual call in the queue of the first split being more than a predetermined amount of time, for determining an estimated waiting time of the individual call in the queue of a second split for handling the individual call;

each fourth means comprise sixth means responsive to the determined estimated waiting times of the individual call in the queues of both the first and the second splits being more than the predetermined amount of time, for determining which one of the first and the second splits has a shortest determined estimated waiting time of the individual call in its corresponding call queue; and each third means comprise seventh means responsive to the estimated waiting times of the individual call in the queue of an individual split being no more than the predetermined amount of time, for enqueuing the individual call in the call queue of the individual split, and responsive to the determined estimated waiting times of the individual call in the queues of both the first and the second splits being more than the predetermined amount of time, for enqueuing the individual call in the call queue of the split determined by the sixth means of its call center to have the shortest determined estimated waiting time.

17. The call-center system of claim 16 wherein:

the sixth means of an individual call center determine the second split to have the shortest determined estimated waiting time;

the first means of the individual call center further comprise eighth means for timing a time interval, ninth means responsive to the determination by the sixth means of the individual call center, for causing the eighth means of the individual call center to begin timing a first time interval, and the fifth means of the individual call center are responsive to receipt of a second individual call b the individual call center when the eighth means of the individual call center have not completed timing the first time interval, for skipping a determining of an estimated waiting time of the second individual call in the queue of the first split and determining an estimated waiting time of the second individual call in the queue of the second split, are responsive to the receipt of the second individual call by the individual call center when the eighth means of the individual call center have completed timing the first time interval, for determining an estimated waiting time of the second individual call in the queue of the first split, and are responsive to the determined estimated waiting time of the second individual call in tie queue of the first split being more than a predetermined amount of time, for determining the estimated waiting time of the second individual call in the queue of the second split.

18. The call-center system of claim 11 wherein:

the present values of the parameter indicate weighted estimated waiting times of the individual call in queues of the splits for handling the individual call; and each second means comprise fourth means for determining a split for handling the individual call which has a shortest weighted estimated waiting time of the individual call in its corresponding call queue, as the best split.

19. The call-center system of claim 18 wherein:

each first means comprise fifth means for determining an estimated waiting time of the individual call in the queue of a first split for handling the individual call, and responsive to the determined estimated waiting time of the individual call in the queue of the first split being more than a predetermined amount of time, for determining an estimated waiting time of the individual call in the queue of a second split for handling the individual call;

each fourth means comprise sixth means responsive to the estimated waiting time of the individual call in the queue of a predetermined split being more than the predetermined amount of time, for incrementing the estimated waiting time in the queue of the predetermined split by a predetermined amount to obtain a weighted estimated waiting time in the queue of the predetermined split, and seventh means responsive to the determined estimated waiting times of the individual call in the queues of both the first and the second splits being more than the predetermined amount of time, for determining which one of the first and the second splits has a shortest weighted estimated waiting time of the individual call in its corresponding call queue; and each third means comprise eighth means responsive to the estimated waiting times of the individual call in the queue of an individual split being no more than a predetermined amount of time, for enqueuing the individual call in the call queue of the individual split, and responsive to the estimated waiting times of the individual call in the queues of both the first and the second splits being more than the predetermined amount of time, for enqueuing the individual call in the call queue of the split determined by the seventh means of its call center to have the shortest weighted estimated waiting time.

20. The call center of claim 19 wherein:

the seventh means of an individual call center determine the second split to have the shortest weighted estimated waiting time;

the first means of the individual call center further comprise ninth means for timing a time interval, tenth means responsive to the determination by the seventh means of the individual call center, for causing the ninth means of the individual call center to begin timing a first time interval, and the fifth means of the individual call center am responsive to receipt of a second individual call by the individual call center when the ninth means of the individual call center have not completed timing the first time interval, for skipping a determining of an estimated waiting time of the second individual call in the queue of the first split and determining an

17 estimated waiting time of the second individual call in the queue of the second split, are responsive to the receipt of the second individual call by the individual call center when the ninth means of the individual call center have completed timing the first time interval, for determining an estimated waiting time of the second individual call in the queue of the first split, and are responsive to the determined estimated waiting time of the second individual call in the queue of the first split being more than a predetermined amount of time, for determining the estimated waiting time of the second individual call in the queue of the second split.

21. A method of distributing calls in a call-handling system that has, for each one of a plurality of calls, a plurality of call-handling facilities, comprising the steps of:

in response to receipt of a call by me one of a plurality of the call-handling facilities for handling by the call-handling system, the receiving handling facility determining, for each one of the call's plurality of call-handling facilities, the present value of a parameter predetermined to define what is a best call-handling facility;

the receiving call-handling facility evaluating said present values to determine a best call-handling facility for the call from among the call's plurality of call-handling facilities; and in response to a determination of the best call-handling facility, the receiving call-handling facility directing the call to the best call-handling facility.

22. The method of claim 21 for a call-handling system wherein each call-handling facility comprises a different split of call-center agents.

23. The method of claim 21 for a call-handling system wherein each call-handling facility comprises a different call center.

24. The method of claim 21 for a call-handling system wherein each call-handling facility comprises a different split of call-center agents of a plurality of call centers.

25. The method of claim 21 wherein:

the present values of the parameter indicate how expeditiously individual ones of the call-handling facilities will handle the call; and the step of evaluating said present values to determine a best call-handling facility comprises the step of in response to a determination of the present values of the parameter, the receiving call-handling facility determining from the present values a call-handling facility that will handle the call most expeditiously; and the step of directing the call to the best call-handling facility comprises the step of in response to a determination of which one of the call-handling facilities will handle the call most expeditiously, the receiving call-handling facility directing the call to the call-handling facility that will handle the call most expeditiously.

26. The method of claim 21 wherein:

the present values of the parameter indicate periods of time in which each of said call-handling facilities are likely to handle the call; and the step of evaluating said present values to determine a best call-handling facility comprises the step of in response to a determination of the present values of the parameter, the receiving call-handling facility determining from the present values a call-handling facility for the call, from among the call's plurality of call-handling facilities, which is likely to handle the call in a shortest period of time.

27. The method of claim 21 wherein:

the present values of the parameter indicate periods of time in which each of said call-handling facilities are likely to handle the call; and the step of evaluating said present values to determine a best-call handling facility comprises the step of in response to a determination of the present values of the parameter, the receiving call-handling facility determining from the present values a call-handling facility for the call, from among the call's plurality of call-handling facilities, which is likely to handle the call in a shortest weighted period of time.

28. The method of claim 21 for a call-handling system wherein each call-handling facility has a corresponding call queue, wherein:

the step of directing comprises the step of in response to a determination of the best call-handling facility for handling the call, enqueuing the call in the call queue of the best call-handling facility.

29. The method of claim 28 wherein:

the step of determining present values of a parameter comprises the step of the receiving call-handling facility determining estimated waiting times of the call in the call queues of the call's call-handling facilities; and the step of evaluating said present values to determine a best call-handling facility for the call comprises the step of the receiving call-handling facility determining a call-handling facility having a shortest estimated waiting time of the call in the corresponding call queue, as the best call-handling facility.

30. The method of claim 28 wherein:

the step of determining present values of a parameter comprises the step of the receiving call-handling facility determining weighted estimated waiting times of the call in the call queues of the call's call-handling facilities; and the step of evaluating said present values to determine a best call-handling facility for the call comprises the step of the receiving call-handling facility determining a call-handling facility having a shortest weighted estimated waiting time of the call in the corresponding call queue, as the best call-handling facility.

31. A method of distributing arriving calls in a call-center system comprising a plurality of first agent splits for handling calls, a plurality of said first agent splits being second agent splits for handling an individual call, a plurality of call queues each corresponding to a different one of the first agent splits, each for holding calls for handling by the corresponding first agent split, and at least one call center that includes the plurality of first agent splits and the plurality of call queues, the method comprising the steps of:

in response to receipt of the individual call by a call center, the receiving call center determining for each one of the second agent splits, the present value of a parameter predetermined to define what is a best split for handling the individual call;

in response to a determination by the receiving call center of the present values, the receiving call center evaluating the present values to determine the best second split for handling the individual call; and in response to a determination by the receiving call center of the best second split for handling the call, the receiving call center effecting enqueuing of the individual call in the call queue of the best second split.

32. The method of claim 31 wherein:

the present values of the parameter indicate how expeditiously the second splits will handle the individual call;

the step of evaluating the present values to determine the best second split for handling the individual call comprises the step of in response to a determination by the receiving call center of the present values of the parameter, the receiving call center determining which one of the second splits will handle the call most expeditiously; and the step of effecting enqueuing comprises the step of in response to a determination by the receiving call center of the second it that will handle the call most expeditiously, the receiving call center effecting queuing of the individual call in the call queue of the second split that will handle call most expeditiously.

33. The method of claim 31 wherein:

the step of determining the present value of the parameter for each second split comprises the steps of determining whether facilities are available for connecting the individual call to an individual second split, and in response to a determination that facilities am not available for connecting the individual call to the individual second split, taking the individual second split out of contention for being the best second split for handling the individual call.

34. The method of claim 31 wherein:

the step of determining the present value of the parameter for each second split comprises the steps of determining which ones of the second splits are presently unlikely to be a best second split for handling the individual call, and in response to a determination of which ones of the second splits are presently unlikely to be a best second split for handling the individual call, determining the present values of the parameter of only the second splits other than said ones of the second splits.

35. The method of claim 31 wherein:

the present values of the parameter indicate estimated waiting times of the individual call in queues of the second splits; and the step of determining the present value of the parameter for each second split comprises the step of determining a second split which has a shortest estimated waiting time of the individual call in its corresponding call queue, as the best second split.

36. The method of claim 35 wherein:

the step of determining a second split which has a shortest estimated waiting time of the individual call in its corresponding call queue, as the best second split, comprises the steps of determining an estimated waiting time of the individual call in the call queue of an individual one of the second splits and in response to the determined estimated waiting time of the individual call in the queue of the individual one of the second slits being more than a predetermined amount of time, determining an estimated waiting time of the individual call in the queue of another one of the second splits;

the step of determining a second split which has a shortest estimated waiting time of the individual call in its corresponding call queue, as the best second split, comprises the step of in response to the determined estimated waiting times of the individual call in the queues of both the individual and the other one of the second splits being more than the predetermined amount of time, determining which one of the individual and the other one of the second splits has a shortest determined estimated waiting time of the individual call in its corresponding call queue; and the step of effecting enqueuing comprises the steps of in response to the estimated waiting time of the individual call in the queue of an individual one of the second splits being no more than a redetermined amount of time, enqueuing the individual call in the call queue of the individual one of the second splits, and in response to the determined estimated waiting times of the individual call in the queues of both the individual and the other one of the second splits being more than the predetermined amount of time, enqueuing the individual call in the call queue of the one of the second splits determined to have the shortest determined estimated waiting time.

37. The method of claim 36 wherein the step of determining which one of the individual and the other one of the second splits has the shortest determined estimated waiting time determines that the other one of the second has the shortest determined estimated waiting time, and the method further comprises the steps of:

in response to the determination that the other one of the second its has the shortest determined estimated waiting time, beginning to time a first interval;

in response to receipt by the receiving call center of a second individual call when timing of the first time interval has not been completed, skipping a determining of an estimated waiting time of the second individual call in the queue of the individual one of the second splits and determining an estimated waiting time of the second individual call in the queue of the other one of the second splits;

in response to the receipt of the second individual call when the timing of the first time interval has been completed, determining an estimated waiting time of the second individual call in the queue of the individual one of the second splits; and in response to the determined estimated waiting time of the second individual call in the queue of the individual one of the second splits being more than a predetermined amount of time, determining the estimated waiting time of the second individual call in the queue of the other one of the second splits.

38. The method of claim 31 wherein:

the present values of the parameter indicate weighted estimated waiting times of the individual call in queues of the second splits; and the step of evaluating the present values to determine the best second split for handling the call comprises the step of determining a second split for handling the individual call which has a shortest weighted estimated waiting rime of the individual call in its corresponding call queue, as the best second split.

39. The method of claim 38 wherein:

the step of determining the present values of the parameter comprises steps of determining an estimated waiting time of the individual call in the queue of an individual one of the second splits, and in response to the determined estimated waiting time of the individual in the queue of the individual one of the second being more than a predetermined amount of time, determining an estimated waiting time of the individual call in the queue of another one of the second splits;

the step of determining a second split which has a shortest weighted estimated waiting time comprises the steps of in response to the estimated waiting time of the individual call in the queue of the individual or the other one of the second splits being more than the predetermined amount of time, incrementing the estimated waiting time in the queue of the individual or the other one of the second splits by a predetermined amount to obtain a weighted estimated waiting time in the queue of the individual or the other one of the second splits, and in response to the determined estimated waiting times of the individual call in the queues of both the individual and the other one of the second splits being more than the predetermined amount of time, determining which one of the individual and the other one of the second splits has a shortest weighted estimated waiting time of the individual call in its corresponding call queue; and the step of effecting enqueuing comprises the steps of in response to Me estimated waiting time of the individual call in the queue of the individual or the other one of the second splits being determined to be no more than a predetermined amount of time, enqueuing the individual call in the call queue of the individual or the other one of the second splits, and in response to the estimated waiting times of the individual call in the queues of both the individual and the other one of the second splits being more an the predetermined amount of time, enqueuing the individual call in the call queue of the individual or the other one of the second slits determined to have the shortest weighted estimated waiting time.

40. The method of claim 39 wherein the step of determining which one of the individual and the other one of the second splits has the shortest weighted estimated waiting time determines that the other one of the second splits has the shortest weighted estimated waiting time, and the method further comprises the steps of:

in response to the determination that the other one of the second splits has the shortest weighted estimated waiting time, beginning to time a first time interval;

in response to receipt of a second individual call by the receiving call center when timing of the first time interval has not been completed, skipping a determining of an estimated waiting time of the second individual call in the queue of the individual one of the second splits and determining an estimated waiting time of the second individual call in the queue of the other one of the second splits;

in response to the receipt of the second individual call when the timing of the first time interval has been completed, determining an estimated waiting time of the second individual call in the queue of the individual one of the second splits; and in response to the determined estimated waiting time of the second individual call in the queue of the individual one of the second splits being more than a predetermined amount of time, determining the estimated waiting time of the second individual call in the queue of the other one of the second splits.

\* \* \* \* \*